(12) United States Patent
Desai

(10) Patent No.: US 8,596,686 B1
(45) Date of Patent: Dec. 3, 2013

(54) MOVEABLE SHOWER JOINT

(71) Applicant: Haresh S. Desai, Biloxi, MS (US)

(72) Inventor: Haresh S. Desai, Biloxi, MS (US)

( * ) Notice: Subject to any disclaimer, the term of this patent is extended or adjusted under 35 U.S.C. 154(b) by 0 days.

(21) Appl. No.: 13/663,123

(22) Filed: Oct. 29, 2012

(51) Int. Cl.
*F16L 27/00* (2006.01)
(52) U.S. Cl.
USPC .................. 285/185; 285/272; 239/587.6
(58) Field of Classification Search
USPC ......... 285/184, 185, 272, 278, 279, 280, 281; 239/587.3, 587.4, 587.5, 587.6
See application file for complete search history.

(56) References Cited

U.S. PATENT DOCUMENTS

| | | | | |
|---|---|---|---|---|
| 1,123,839 A | * | 1/1915 | Bridges | 285/279 |
| 1,758,115 A | * | 5/1930 | Kelly | 239/587.4 |
| 2,831,709 A | * | 4/1958 | Shaw et al. | 285/272 |
| 2,986,344 A | * | 5/1961 | Knight | 285/279 |
| 3,026,129 A | * | 3/1962 | Courtot et al. | 285/272 |
| 3,940,072 A | * | 2/1976 | Ishikawa et al. | 239/587.5 |
| 4,549,753 A | * | 10/1985 | Nuytten | 285/281 |
| 4,596,362 A | * | 6/1986 | Pralle et al. | 239/587.4 |
| 4,717,180 A | * | 1/1988 | Roman | 285/148.19 |
| 5,275,444 A | * | 1/1994 | Wythoff | 285/272 |
| 5,398,978 A | * | 3/1995 | Gagnon | 285/184 |
| 6,216,965 B1 | * | 4/2001 | Chao | 239/587.4 |
| 6,264,121 B1 | * | 7/2001 | McClary | 239/587.4 |
| 6,425,149 B1 | * | 7/2002 | Wang | 285/184 |
| 6,511,001 B1 | * | 1/2003 | Huang | 239/587.6 |
| 6,540,163 B1 | * | 4/2003 | Huang | 239/587.5 |
| 6,712,294 B1 | * | 3/2004 | Wang | 239/587.5 |
| 6,726,129 B2 | * | 4/2004 | Kao | 239/587.1 |
| 6,988,678 B1 | * | 1/2006 | Chen | 239/586 |

* cited by examiner

Primary Examiner — David E Bochna
(74) Attorney, Agent, or Firm — Jeremy M. Clay

(57) ABSTRACT

A moveable shower joint adapted to give a user the ability to adjust a showerhead in any direction. The moveable shower joint has upper and lower rotating circular members that may be turned clockwise or counterclockwise to any position. A water inlet is incorporated into the exterior of the upper circular member, and a water outlet is incorporated into the exterior of the lower circular member. A circular seal is retained in a groove in the inner rim of a circular member. Annular tooth rings in the inner rims of the circular members work together to hold the moveable shower joint in place when the desired position is reached. A floating annular tooth ring in the lower member engages a fixed annular tooth ring in the lower member. Springs press the floating tooth ring into the fixed ring, creating the friction needed to hold the joint in place. The water inlet may incorporate a ball joint with a set screw to provide additional adjustability, and a showerhead may be attached to the water outlet. The moveable shower joint's inlet and outlet may be internally or externally threaded to facilitate connection with other plumbing fixtures.

7 Claims, 4 Drawing Sheets

MOVEABLE SHOWER JOINT

FIELD OF THE DISCLOSURE

Shower fixtures.

PRIORITY

This application does not claim the priority date of any other applications.

BACKGROUND OF THE INVENTION

Showerheads are commercially available in numerous designs and configurations. The types of showerheads may be broadly categorized as being either stationary or oscillating and having either fixed or adjustable water jets. A typical stationary showerhead is composed of a water chamber and a number of jets that deliver water in a constant spray pattern. The showerhead typically incorporates a standard ball joint that is connected to the water outlet pipe via a threaded connection. The ball joint gives the user the ability to adjust the position of the showerhead, but the range of adjustability is limited. Additionally, the position of the showerhead is limited because a standard ball joint lacks the strength to support a heavy showerhead when the user attempts to point the showerhead upwards or to the side. Other showerheads may incorporate an oscillating mechanism that produces a variable water spray pattern. These oscillating heads also typically use a standard ball joint to connect the showerhead to the water outlet pipe, and they suffer the same drawback of a limited range of adjustability.

Accordingly, there remains a need for an improved joint to connect a showerhead to the water outlet pipe that gives a user greater ability to adjust the position of the showerhead and the flow of water.

SUMMARY OF THE INVENTION

The moveable shower joint is specifically adapted to give a user almost unlimited ability to adjust a showerhead in any direction, overcoming problems associated with the prior art. The moveable shower joint has upper and lower rotating circular members. A water inlet is incorporated into the exterior of the upper circular member, and a water outlet is incorporated into the exterior of the lower circular member. A circular seal is retained in at least one groove in the inner rim of a circular member.

The moveable shower joint's upper and lower rotating circular members may be adjusted by the user to point a showerhead in any direction. Annular tooth rings in the inner rims of the circular members work together to hold the moveable shower joint in place when the desired position is reached. A floating annular tooth ring in the lower member engages a fixed annular tooth ring in the lower member. Springs press the floating tooth ring into the fixed ring, creating the friction needed to hold the joint in place.

The water inlet may incorporate a ball joint with a set screw to provide additional adjustability, and a showerhead may be attached to the water outlet. The moveable shower joint's inlet and outlet may be internally or externally threaded to facilitate connection with other plumbing fixtures.

DETAILED DESCRIPTION

Figure 1:
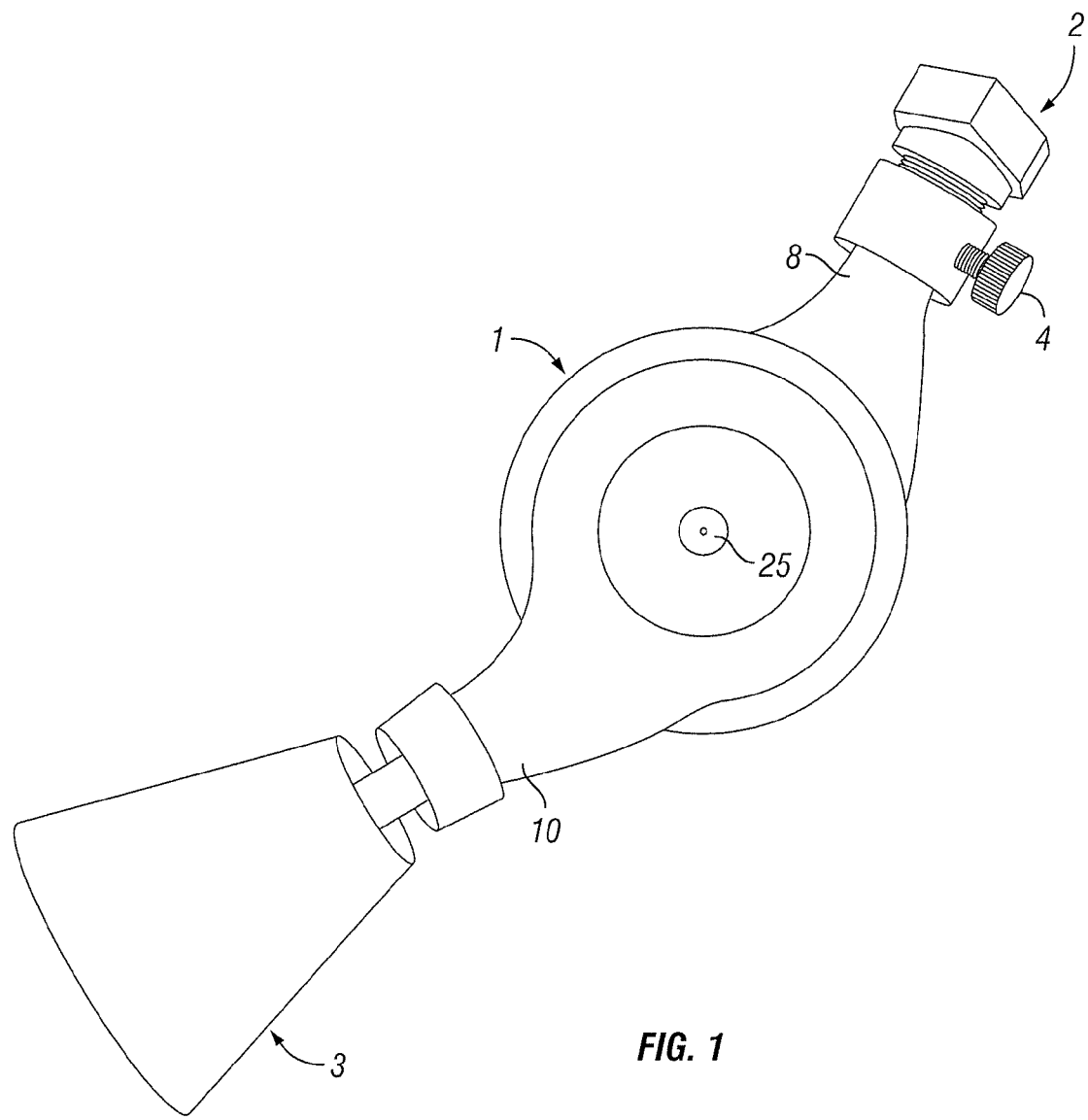
FIG. 1 is side view of a moveable shower joint assembled with a ball joint and shower head.

The moveable shower joint is a plumbing fixture that gives a user the ability to adjust the position of a showerhead and the flow of water in almost any direction. FIG. 1 is side view of a moveable shower joint 1 assembled with a ball joint 2 and a shower head 3. The ball joint 2 in this embodiment allows the moveable shower joint 1 assembly to freely rotate. A set screw 4 is incorporated into ball joint 2. The set screw 4 is adapted to restrict movement of the shower joint assembly when the set screw 4 is tightened.

Figure 2:
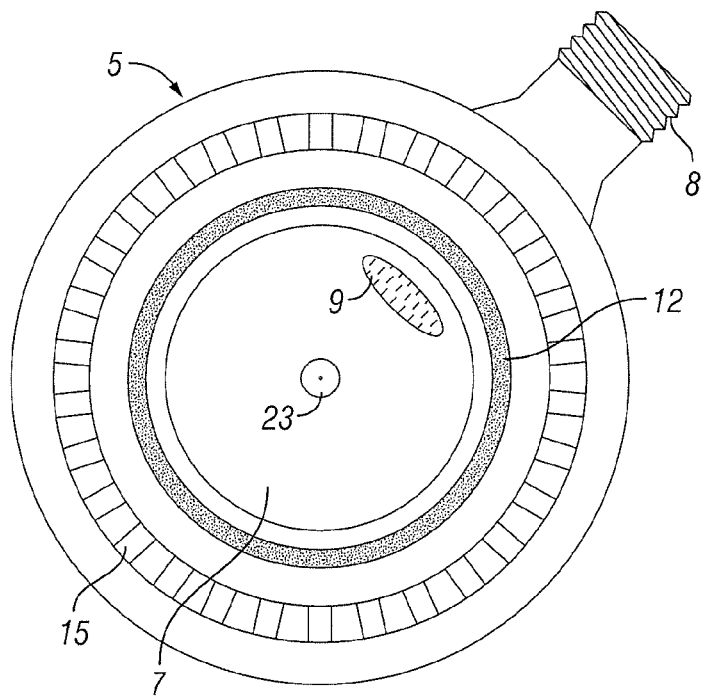
FIG. 2 is cut-away view of the interior of the upper and lower members of the moveable shower joint.
Figure 2:
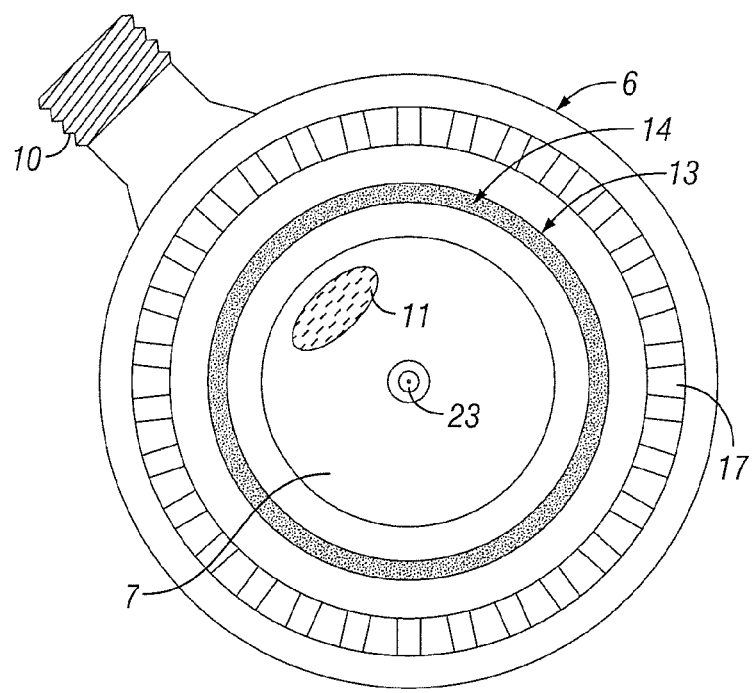

The moveable shower joint 1 is made up of two rotating circular members. FIG. 2 depicts the interior of the upper rotating circular member 5 and the lower rotating circular member 6. Each of the circular members 5, 6 form an annular cavity 7 for water to flow through. A water inlet 8 is located on the exterior of the upper circular member 5. In this embodiment, the inlet 8 is externally threaded to allow the moveable shower joint 1 to be attached to other plumbing fixtures. The water inlet 8 may also include a ball joint 2 as depicted in FIG. 1, or it may be internally threaded to attach to other fixtures. The water inlet 8 is connected to the annular cavity 7 via a fluid passageway 9.

A water outlet 10 is located on the exterior of the lower circular member 6. The water outlet 10 is externally threaded to allow the moveable shower joint 1 to be attached to other plumbing fixtures. The outlet 10 may be internally threaded or it may be directly attached to another plumbing fixture like the showerhead 3 depicted in FIG. 1. The water outlet 10 is connected to the annular cavity 7 via a fluid passageway 11. When the moveable shower joint 1 is assembled, water flows into the inlet 8, through the upper member 5 fluid passageway 9, into the annular cavity 7, into the lower member 6 fluid passageway 11, and out the outlet 10.

A circular seal retaining groove is incorporated into the inner rim of at least one of the rotating circular members 5, 6. In the embodiment depicted in FIG. 2, the inner rim of the upper member 5 contains a circular seal retaining groove 12, and the inner rim of the lower member 6 contains a similar seal retaining groove 13. When the upper member 5 and lower member 6 are assembled, a seal 14 is retained in the seal retaining grooves 12, 13. The seal 14 prevents water from escaping out the sides of the moveable shower joint 1, and it may include a conventional O-ring or other suitable sealing means.

Figure 3:
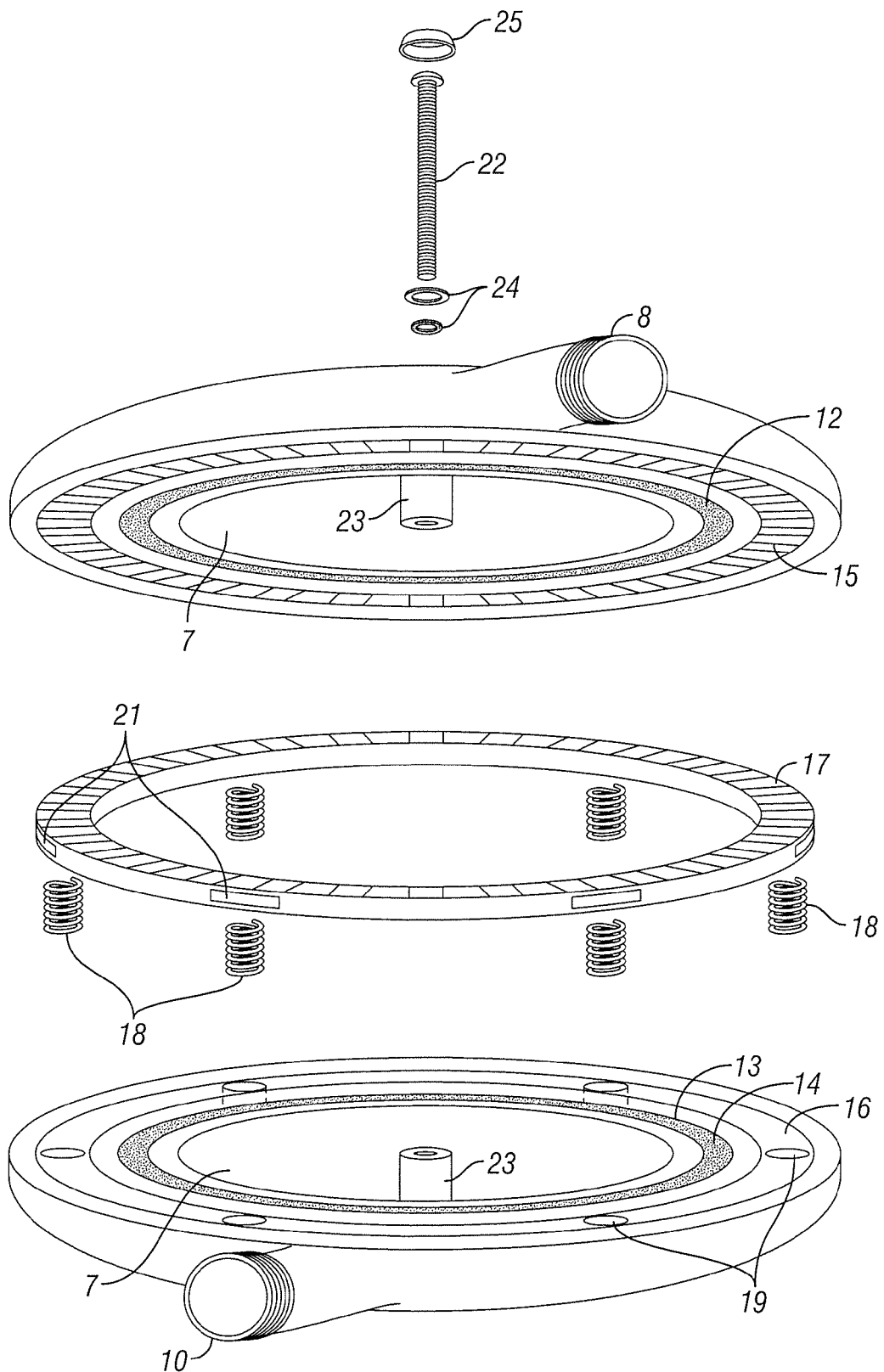
FIG. 3 is a side view of a disassembled moveable shower joint.

FIG. 3 is an "exploded" view of the disassembled moveable shower joint 1. A fixed annular tooth ring 15 is molded into the inner rim of the upper rotating circular member 5. A circular groove 16 is cut into the inner rim of lower member 6 directly opposite the fixed annular tooth ring 15. A floating annular tooth ring 17 fits into and is retained in the circular groove 16. A plurality of springs 18 are retained beneath the floating annular tooth ring 17. The bases of the springs 18 are held in place by a series of apertures 19 formed in the bottom of the circular groove 16.

The springs 18 press the floating annular tooth ring 17 upward to engage the fixed annular tooth ring 15. The upper member 5 and lower member 6 can be rotated by the user in any direction. To accomplish this, all that is required is to grasp the members 5, 6 and apply pressure to rotate the members 5, 6 either clockwise or counter clockwise. When the desired position is reached, all a user has to do is stop applying force. Friction between the fixed annular tooth ring 15 and the floating annular tooth ring 17 holds the upper member 5 and the lower member 6 in the chosen position. Because the moveable shower joint 1 can be rotated a full 360 degrees and then held in the chosen position, it gives the user a far greater range of adjustability than traditional ball joints and showerheads.

Figure 4:
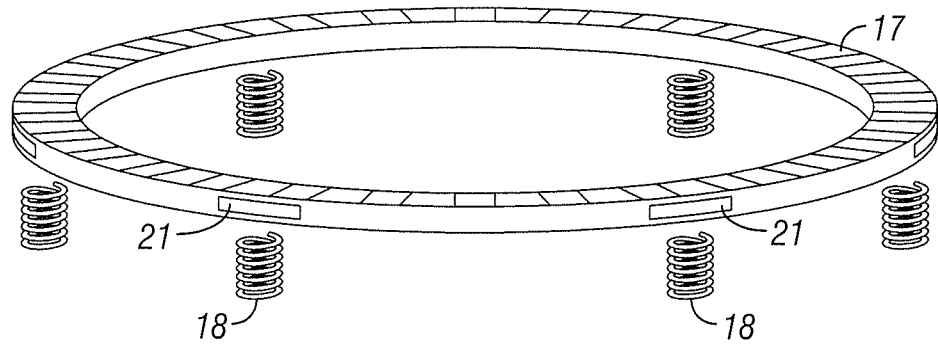
FIG. 4 is a perspective view of the floating annular tooth ring and springs.
Figure 4A:
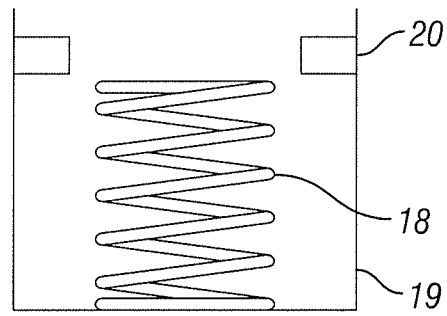
FIG. 4a is a close up cut-away view of circular groove that retains the floating annular tooth ring without the annular tooth ring in place.
Figure 4B:
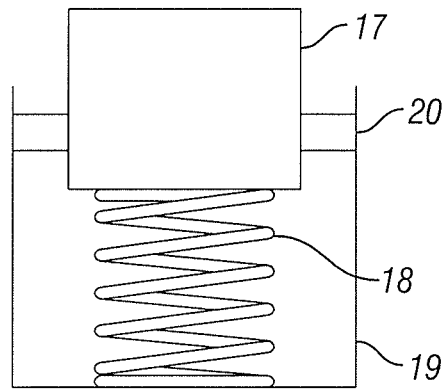
FIG. 4b is a close up cut-away view of circular groove that retains the floating annular tooth ring with the annular tooth ring in place.

FIGS. 4a and 4b are close up cut-away views of the apertures 19 formed in the bottom of the circular groove 16. Springs 18 retained in the apertures 19 provide constant upward pressure on the floating annular tooth ring 17. The apertures 19 contain one or more tabs 20 that are adapted to engage notches 21 cut into the sides of the floating annular tooth ring 17. When the floating annular tooth ring 17 is pressed into the circular groove 16, the tabs 20 snap into the notches 21, holding the floating annular tooth ring 17 in place.

The moveable shower joint may be assembled using a threaded screw 22, depicted in FIG. 3. The screw 22 is threaded into screw receiving studs 23 that are located in the center of the annular cavity 7. The screw 22 provides a center pivot point about which the upper circular member 5 and lower circular member 6 can rotate. A set of washers or seals may be assembled with the screw 22 to prevent leaks. A decorative cap 25 may be placed over the head of the screw 22.

The foregoing description of preferred embodiments for the moveable shower joint is presented for the purposes of illustration and description. They are not intended to be exhaustive or to limit the invention to the precise form disclosed. Obvious modifications or variations are possible in light of the above teachings. The embodiments are chosen and described in an effort to provide the best illustration of the principles of the invention and its practical applications, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A moveable shower joint comprising:
    upper and lower rotating circular members;
    an annular cavity defined between the upper and lower circular members;
    an inlet on the upper circular member that is connected to the annular cavity through a fluid passageway;
    an outlet on the lower circular member that is connected to the annular cavity through a fluid passageway;
    at least one circular seal retaining groove in the inner rim of a circular member;
    a ring shaped seal that fits within the circular seal retaining groove when the upper and lower circular members are joined;
    a fixed annular tooth ring incorporated in the inner rim of the upper circular member;
    a floating annular tooth ring that is retained in a circular groove in the inner rim of the lower circular member; and
    a plurality of springs retained below the floating annular tooth ring that press the floating annular tooth ring upward to engage the fixed annular tooth ring, so that the upper and lower circular members may be rotated into any position when force is applied by a user, and friction between the fixed annular tooth ring and the floating annular tooth ring holds the upper and lower circular members in the chosen position when the user ceases to apply force.

2. The moveable joint of claim 1, further comprising a screw receiving stud incorporated into the upper rotating circular member and a screw receiving stud in the lower rotating circular member, so that a screw placed into the studs passes through the center of the annular cavity defined by the upper and lower circular members, and the screw provides a center pivot point about which the upper and lower circular members can rotate.

3. The moveable joint of claim 1, further comprising a moveable ball joint incorporated onto the inlet of the upper circular member, where the moveable ball joint includes a set screw that is adapted to restrict rotation of the joint assembly when the set screw is tightened.

4. The moveable joint of claim 1, further comprising a threaded fitting on the inlet of the upper circular member to facilitate connection of the moveable joint to other plumbing fixtures.

5. The moveable joint of claim 1, further comprising a threaded fitting on the outlet of the lower circular member to facilitate connection of the moveable joint to other plumbing fixtures.

6. A moveable shower joint assembly comprising:
    an upper water inlet that incorporates a moveable ball joint that allows the shower joint assembly to freely rotate;
    a set screw incorporated into the moveable ball joint that is adapted to restrict rotation of the shower joint assembly when the set screw is tightened;
    a threaded fitting on the upper water inlet adapted to connect the shower joint assembly to other plumbing fixtures;
    a moveable joint comprising:
        (a) upper and lower rotating circular members;
        (b) an annular cavity defined between the upper and lower circular members;
        (c) an inlet on the upper circular member that is connected to the annular cavity through a fluid passageway;
        (d) an outlet on the lower circular member that is connected to the annular cavity through a fluid passageway;
        (e) at least one circular seal retaining groove in the inner rim of a circular member;
        (f) a ring shaped seal that fits within the circular seal retaining groove when the upper and lower circular members are joined;
        (g) a fixed annular tooth ring incorporated in the inner rim of the upper circular member;
        (h) a floating annular tooth ring that is retained in a circular groove in the inner rim of the lower circular member,
        (i) a plurality of springs retained below the floating annular tooth ring that press the floating annular tooth ring upward to engage the fixed annular tooth ring, so that the upper and lower circular members may be freely rotated into any position when force is applied by a user, and friction between the fixed annular tooth ring and the floating annular tooth ring holds the upper and lower circular members in the chosen position when the user ceases to apply force; and a threaded lower water outlet that is adapted to connect the shower joint assembly to other plumbing fixtures.

7. The two in one shower joint assembly of claim 6, further comprising a shower head attached to the threaded lower water outlet.

* * * * *